(12) United States Patent
Doi

(10) Patent No.: US 10,942,345 B2
(45) Date of Patent: Mar. 9, 2021

(54) IMAGE ACQUISITION METHOD AND IMAGE ACQUISITION DEVICE

(71) Applicant: OLYMPUS CORPORATION, Tokyo (JP)

(72) Inventor: Atsushi Doi, Tokyo (JP)

(73) Assignee: OLYMPUS CORPORATION, Tokyo (JP)

(*) Notice: Subject to any disclaimer, the term of this patent is extended or adjusted under 35 U.S.C. 154(b) by 46 days.

(21) Appl. No.: 16/118,705

(22) Filed: Aug. 31, 2018

(65) Prior Publication Data

US 2018/0373011 A1 Dec. 27, 2018

Related U.S. Application Data

(63) Continuation of application No. PCT/JP2016/058018, filed on Mar. 14, 2016.

(51) Int. Cl.
*H04N 7/18* (2006.01)
*G02B 21/00* (2006.01)
(Continued)

(52) U.S. Cl.
CPC ........... *G02B 21/008* (2013.01); *G01N 21/64* (2013.01); *G01N 21/6456* (2013.01);
(Continued)

(58) Field of Classification Search
CPC ............... G01N 21/64; G01N 21/6456; G01N 21/6402; G01N 2021/6463;
(Continued)

(56) References Cited

U.S. PATENT DOCUMENTS 5,943,133 A 8/1999 Zeylikovich et al.
2001/0046054 A1 11/2001 Zeylikovich et al.
(Continued)

FOREIGN PATENT DOCUMENTS

CN 103048299 B * 1/2015
JP H07-3508 B2 1/1995
(Continued)

OTHER PUBLICATIONS

International Search Report dated Jun. 7, 2016 issued in PCT/JP2016/058018.
(Continued)

*Primary Examiner* — Peet Dhillon
(74) *Attorney, Agent, or Firm* — Scully, Scott, Murphy & Presser, P.C.

(57) ABSTRACT

An image acquisition method in which a pulsed illumination beam emitted from a light source is scanned while being focused at a sample, signal light generated as a result of a non-linear optical process at each scanning position is detected, and an image of the sample is generated on a basis of the detected signal light, the image acquisition method including: acquiring a mixed image, which includes in-focus signal light generated at a focal position of the illumination beam in the sample and which also includes out-of-focus signal light; acquiring an image of the out-of-focus signal light on a basis of a plurality of mixed images having mutually different intensities of the out-of-focus signal light; and acquiring an image of the in-focus signal light by subtracting the image of the out-of-focus signal light acquired, from the mixed image acquired.

10 Claims, 8 Drawing Sheets

(51) Int. Cl.
*G01N 21/64* (2006.01)
*G02B 21/36* (2006.01)

(52) U.S. Cl.
CPC ......... *G02B 21/00* (2013.01); *G02B 21/0032* (2013.01); *G02B 21/0076* (2013.01); *G02B 21/367* (2013.01); *G01N 21/6402* (2013.01); *G01N 2021/6463* (2013.01); *G02B 2207/113* (2013.01); *G02B 2207/114* (2013.01)

(58) Field of Classification Search
CPC ........... G02B 21/0032; G02B 21/0076; G02B 21/008; G02B 21/367; G02B 2207/113; G02B 2207/114
USPC .......................................................... 348/79
See application file for complete search history.

(56) References Cited

U.S. PATENT DOCUMENTS

| | | | |
|---|---|---|---|
| 2003/0090674 A1 | 5/2003 | Zeylikovich et al. | |
| 2009/0084980 A1 | 4/2009 | Mertz | |
| 2013/0020473 A1* | 1/2013 | Kalkbrenner | G02B 21/0032 |
| | | | 250/216 |
| 2013/0128346 A1 | 5/2013 | Sanguu | |
| 2014/0131574 A1* | 5/2014 | Zewail | H01J 37/26 |
| | | | 250/307 |
| 2015/0168703 A1* | 6/2015 | Wei | G02B 21/16 |
| | | | 250/459.1 |
| 2016/0153904 A1 | 6/2016 | Mukoh et al. | |
| 2016/0299080 A1* | 10/2016 | Shiozawa | G01N 21/65 |

FOREIGN PATENT DOCUMENTS

| | | |
|---|---|---|
| JP | H09-229861 A | 9/1997 |
| JP | 4020434 B2 | 12/2007 |
| JP | 2008-309613 A | 12/2008 |
| JP | 2013-130853 A | 7/2013 |
| WO | WO 98/25105 A1 | 6/1998 |
| WO | WO 2012/127907 A1 | 9/2012 |
| WO | WO 2015/033394 A1 | 3/2015 |
| WO | WO 2015/163261 A1 | 10/2015 |

OTHER PUBLICATIONS

Isobe, Keisuke et al., "Background-free deep imaging by spatial overlap modulation nonlinear optical microscopy", Biomedical Optics Express (Jul. 1, 2012), vol. 3, No. 7 R1594-1608, cited in ISR.

Leray, A. et al., "Enhanced Background Rejection in Thick Tissue with Differential-Aberration Two-Photon Microscopy," Biophysical Journal (2008), vol. 94, 1449.

* cited by examiner

IMAGE ACQUISITION METHOD AND IMAGE ACQUISITION DEVICE

This is a continuation of International Application PCT/JP2016/058018, with an international filing date of Mar. 14, 2016, which is hereby incorporated by reference herein in its entirety.

TECHNICAL FIELD

The present invention relates to image acquisition methods and image acquisition devices.

BACKGROUND ART

In an image acquisition device such as a two-photon excitation microscope, when observing a deep region of a sample, the power of a laser beam used for irradiation is increased in order to compensate for a reduction in laser beam power due to scattering or the like in the sample. In this case, two-photon absorption effects also occur in a surface region of the sample due to the laser beam having strong power, and out-of-focus fluorescence generated as a result is detected as noise.

There is a known method for generating an image constituted of only a fluorescence signal from a focal point by excluding an out-of-focus fluorescence signal in such cases (e.g., see Non-Patent Literature 1).

In this method, the spatial distribution of a laser beam at a focal position is modulated by using a deformable mirror to acquire an image for which the efficiency of fluorescence generation at the focal position is decreased, and this image is subtracted from an image including both an out-of-focus fluorescence signal and an in-focus fluorescence signal to acquire the in-focus fluorescence signal.

CITATION LIST

Non Patent Literature

{NPL 1}
A. Leray, K. Lillis and J. Mertz, "Enhanced Background Rejection in Thick Tissue with Differential-Aberration Two-Photon Microscopy," Biophysical Journal, Vol. 94, 1449 (2008).

SUMMARY OF INVENTION

An aspect of the present invention is directed to an image acquisition method in which a pulsed illumination beam emitted from a light source is scanned while being focused at a sample, signal light generated as a result of a non-linear optical process at each scanning position is detected, and an image of the sample is generated on a basis of the detected signal light, the image acquisition method including: acquiring a mixed image, which includes both in-focus signal light generated at a focal position of the illumination beam in the sample and out-of-focus signal light generated at a position other than the focal position in the sample; acquiring an image of the out-of-focus signal light on a basis of a plurality of mixed images having mutually different intensities of the out-of-focus signal light; and acquiring an image of the in-focus signal light by subtracting the image of the out-of-focus signal light acquired, from the mixed image acquired.

Another aspect of the present invention is directed to an image acquisition device including: a scanner that is configured to scan a pulsed illumination beam emitted from a light source; an illumination optical system that is configured to irradiate a sample with the illumination beam scanned by the scanner; a detection optical system that is configured to detect signal light generated as a result of a non-linear optical process at a position where the sample is irradiated with the illumination beam by the illumination optical system; and an image generator that is configured to generate a signal-light image on a basis of the signal light detected by the detection optical system, wherein the image generator is configured to generate an out-of-focus signal-light image from a plurality of images having mutually different intensities of out-of-focus signal light generated at a position other than a focal point of the illumination beam in the sample, and is configured to generate an in-focus signal-light image by subtracting the out-of-focus signal-light image from a mixed image including both in-focus signal light and the out-of-focus signal light generated at a focal position of the illumination beam in the sample.

DESCRIPTION OF EMBODIMENTS

An image acquisition device 1 and an image acquisition method according to an embodiment of the present invention will be described below with reference to the drawings.

Figure 1:
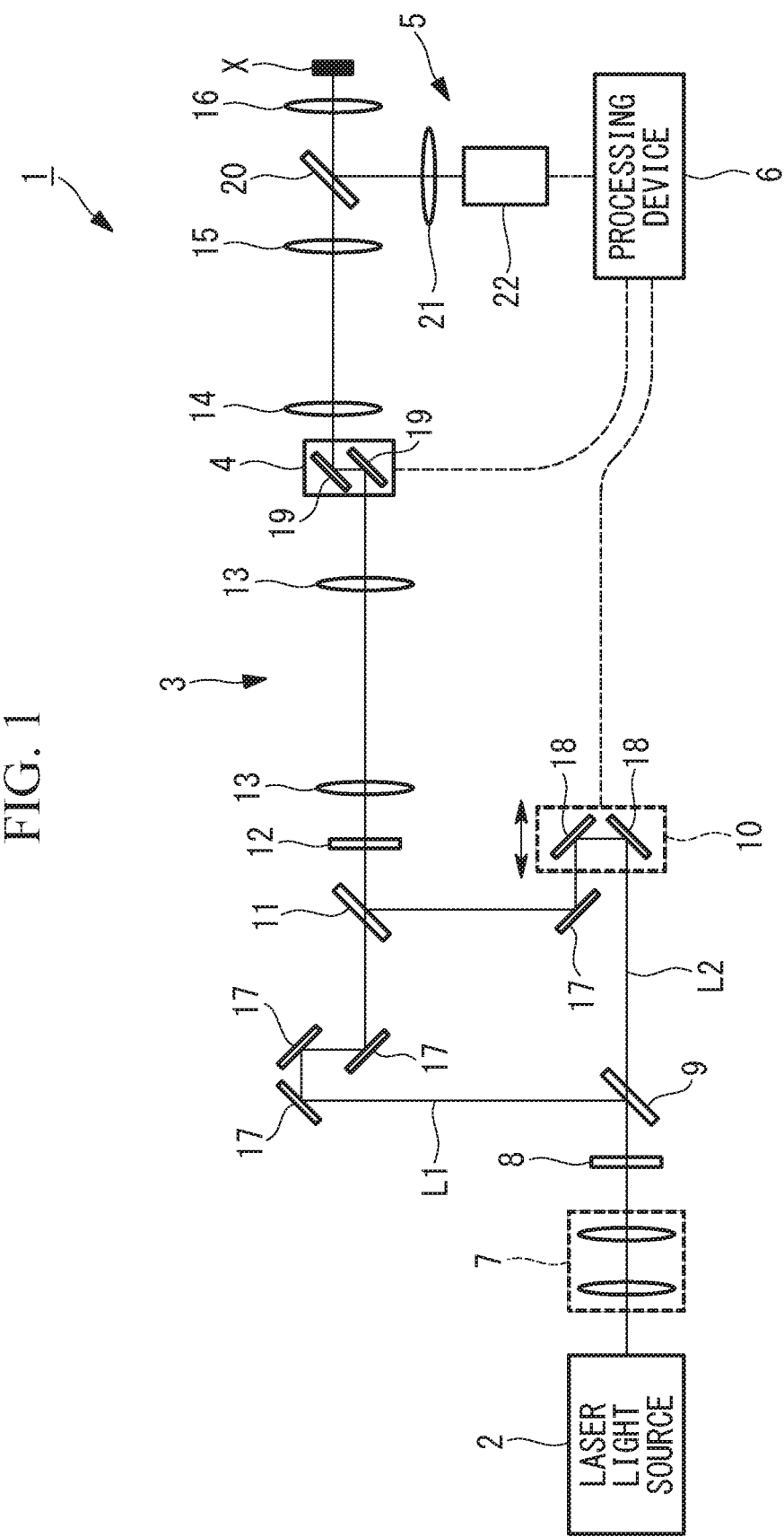
FIG. 1 is a schematic illustration showing an image acquisition device according to an embodiment of the present invention.

The image acquisition device 1 according to this embodiment is a multiphoton-excitation scanning fluorescence microscope. As shown in FIG. 1, the image acquisition device 1 includes a light source (laser light source) 2, such as a titanium-sapphire laser, that emits a near-infrared ultra-short-pulse laser beam (hereinafter referred to as a laser beam); an illumination optical system 3 that irradiates a sample X with the laser beam from the light source 2; a scanning unit 4 that is disposed at a position in the middle of the illumination optical system 3 and that scans the laser beam two-dimensionally; a detection optical system 5 that detects fluorescence (signal light) generated at the sample X being irradiated with the laser beam; and a processing device (image generating unit) 6 that generates an image on the basis of the intensity of the fluorescence detected by the detection optical system 5.

The illumination optical system 3 includes a beam-diameter-adjustment optical system 7 that adjusts the beam diameter of the laser beam from the light source 2; a λ/2 plate 8 that sets the polarization direction of the laser beam to the direction of 45°; a first polarizing beam splitter 9 that splits the laser beam into two optical paths; an optical-path-adjustment optical system 10 that is provided on one of the optical paths; a second polarizing beam splitter 11 that multiplexes the laser beams (a first laser beam and a second laser beam) that have been transmitted via the two optical paths; a λ/4 plate 12 that passes the multiplexed laser beam; a relay lens 13; a pupil projection lens 14; an imaging lens 15; and an objective lens 16. In the figure, the reference sign 17 signifies mirrors for forming optical paths.

The first polarizing beam splitter 9 is configured to split the laser beam introduced thereto, whose polarization direction has been set to 45° by the λ/2 plate 8, into a first laser beam (illumination beam) L1 and a second laser beam (illumination beam) L2 having an intensity ratio of 1:1 and having mutually orthogonal polarization directions.

The second polarizing beam splitter 11 is set such that the emitting angle of the second laser beam L2, which is deflected thereby, slightly varies from that of the first laser beam L1, which passes therethrough.

Since the difference between the emitting angles of the first laser beam L1 and the second laser beam L2 is very small, the optical paths of the two laser beams L1 and L2 after the second polarizing beam splitter 11 are indicated by the same line in FIG. 1.

The optical-path-adjustment optical system 10 is configured to adjust the optical-path length of the second laser beam L2 by moving a pair of mirrors 18 in the arrow directions so that the pulse timings of the first laser beam L1 and the second laser beam L2 after being multiplexed by the second polarizing beam splitter 11 will become simultaneous or non-simultaneous.

The λ/4 plate 12 is configured to convert the multiplexed first laser beam L1 and second laser beam L2 individually into circularly polarized beams.

The scanning unit 4 is, for example, a biaxial galvanometer mirror 19 and is disposed between the relay lens 13 and the pupil projection lens 14. The scanning unit 4 is disposed at a position that is optically conjugate with the second polarizing beam splitter 11 and the pupil position of the objective lens 16 owing to the relay lens 13, the pupil projection lens 14, and the imaging lens 15.

The detection optical system 5 is disposed between the imaging lens 15 and the objective lens 16. The detection optical system 5 includes a dichroic mirror that splits fluorescence collected by the objective lens 16 from the optical path of the laser beam; a condenser lens 21 that condenses the fluorescence split by the dichroic mirror 20; and a light detector 22, such as a photomultiplier tube, that detects the condensed fluorescence.

In the processing device 6, a fluorescence image of the sample X is generated on the basis of the intensity of the fluorescence detected by the light detector 22 and the coordinates of the individual scanning positions. In this embodiment, an in-focus fluorescence image based on fluorescence from a focal position of the laser beam is generated on the basis of three fluorescence images in total: namely, two fluorescence images acquired in a state where the intensity ratio of the first laser beam L1 and the second laser beam L2 has been set to 1:1 by operating the λ/2 plate 8; and a fluorescence image acquired in a state where a setting has been made so as to perform irradiation only with the first laser beam L1 by operating the λ/2 plate 8.

The fluorescence images generated in the state where the intensity ratio of the first laser beam L1 and the second laser beam L2 has been set to 1:1 are a fluorescence image of the fluorescence detected by the light detector 22 when the optical-path length has been set by the optical-path-adjustment optical system 10 such that the pulse timings of the first laser beam L1 and the second laser beam L2 become simultaneous and a fluorescence image of the fluorescence detected by the light detector 22 when the optical-path length has been set by the optical-path-adjustment optical system 10 such that the pulse timings of the first laser beam L1 and the second laser beam L2 become non-simultaneous.

Figure 2:
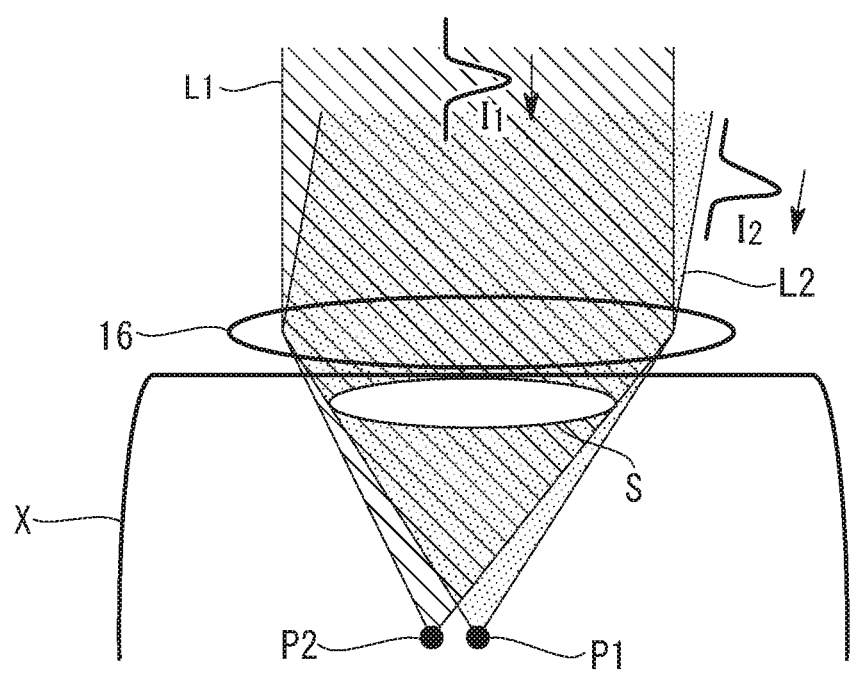
FIG. 2 is an illustration for explaining in-focus fluorescence and out-of-focus fluorescence generated in a sample.

FIG. 2 illustrates how the laser beam is focused at the sample X by the objective lens 16. The pulsed first laser beam L1 and second laser beam L2 are introduced to the pupil of the objective lens 16 at mutually different angles and are respectively focused at a first focal point P1 and a second focal point P2. The angles of introduction of the first laser beam L1 and the second laser beam L2 to the pupil of the objective lens 16 are set such that the first focal point P1 and the second focal point P2 can be separated from each other to such an extent that the respective regions thereof do not overlap each other by adjusting the tilt angle of the second polarizing beam splitter 11.

In the case where the sample X contains a fluorescent substance, the fluorescent substance is excited by the first laser beam L1 and the second laser beam L2, whereby fluorescence (in-focus fluorescence, or in-focus signal light) is generated at the first focal point P1 and the second focal point P2 by multiphoton absorption effects.

Here, in the case where the first focal point P1 and the second focal point P2 are located deep inside the sample X and the powers of the first laser beam L1 and the second laser beam L2 are high, fluorescence (out-of-focus fluorescence, or out-of-focus signal light) is also generated in a region S in the proximity of the surface of the sample X.

In the image acquisition device 1 such as a two-photon excitation microscope, which does not include light-blocking members such as pinholes, the out-of-focus fluorescence from the region S and the in-focus fluorescence from the first focal point P1 and the second focal point P2 are detected in a mixed fashion.

The fluorescence signals generated in the individual regions can be expressed by the following mathematical equations.

First, the in-focus fluorescence individually generated at the first focal point P1 and the second focal point P2 is expressed in equations (1) and (2).

$$I_{fl\_1} = \alpha I_{1\_F}^2 \qquad (1)$$

$$I_{fl\_2} = \beta I_{2\_F}^2 \qquad (2)$$

Here, $I_{fl\_1}$ signifies the intensity of the in-focus fluorescence from the first focal point P1, and $I_{fl\_2}$ signifies the intensity of the in-focus fluorescence from the second focal point P2. Furthermore, $I_{1\_F}$ signifies the intensity of the first laser beam L1 at the first focal point P1, and $I_{2\_F}$ signifies the intensity of the second laser beam L2 at the second focal point P2. Furthermore, $\alpha$ and $\beta$ signify coefficients representing the efficiency of fluorescence generation at the first focal point P1 and the second focal point P2, which depend on the kind, concentration, and distribution of the fluorescent substance. It is because of two-photon excitation that the fluorescence intensities are proportional to the intensities of the laser beams.

Next, the fluorescence intensity $I_{fl\_S}$ in the region S is expressed in equations (3) and (4).

$$I_{fl\_S} = \gamma(I_{1\_S}^2 + I_{2\_S}^2 + 2I_{1\_S}I_{2\_S}) \qquad (3)$$

$$I_{fl\_S} = \gamma(I_{1\_S}^2 + I_{2\_S}^2) \qquad (4)$$

Here, $I_{1-S}$ and $I_{2-S}$ signify the intensities of the first laser beam L1 and the second laser beam L2 in the region S, respectively, and γ signifies a coefficient representing the efficiency of fluorescence generation in the region S. As shown in FIG. 2, the region S is irradiated with both the first laser beam L1 and the second laser beam L2, and thus the intensity of irradiation becomes $(I_{1-S}+I_{2-S})$. Because of two-photon excitation, the fluorescence intensity is the square of the laser beam intensity and is proportional to $(I_{1-S}+I_{2-S})^2 = (I_{1-S}^2 + I_{2-S}^2 + 2I_{1-S} \cdot I_{2-S})$.

Furthermore, in the case where irradiation is performed simultaneously with both the first laser beam L1 and the second laser beam L2, the first laser beam L1 and the second laser beam L2 temporally and spatially overlap each other in the region S, and thus $I_{1-S} \cdot I_{2-S}$ has a component, which is expressed in equation (3). Meanwhile, in the case where irradiation is performed non-simultaneously with the first laser beam L1 and the second laser beam L2, the first laser beam L1 and the second laser beam L2 do not temporally overlap each other, and thus $I_{1-S} \cdot I_{2-S}$ becomes zero, which is shown in equation (4).

That is, by performing irradiation while switching the irradiation timings of the first laser beam L1 and the second laser beam L2 between simultaneous and non-simultaneous timings, the intensity of the out-of-focus fluorescence generated from the region S is switched between equations (3) and (4).

A fluorescence signal actually detected by the light detector 22 represents a mixture of fluorescence individually generated at the first focal point P1, the second focal point P2, and the region S, which is shown in equation (5). By switching the irradiation timings of the first laser beam L1 and the second laser beam L2 between simultaneous and non-simultaneous timings, the out-of-focus fluorescence $I_{fl-S}$ term in equation (5) is switched between equation (3) and equation (4).

Thus, when fluorescence images are obtained individually in cases where the irradiation timings of the first laser beam L1 and the second laser beam L2 are simultaneous and non-simultaneous and the difference between the fluorescence images is calculated, essentially, the difference between equation (3) and equation (4) is calculated, which results in equation (6).

$$I_{fl\_total} = I_{fl-1} + I_{fl-2} + I_{fl-S} \quad (5)$$

$$I_{fl\_total\_sub} = 2\gamma I_{1-S} \cdot I_{2-S} \quad (6)$$

In equation (6), the terms with the coefficients α and β are removed, and only the term with the coefficient γ remains. This indicates that it is possible to extract a fluorescence image formed of only the fluorescence from the region S by using a mixed image in which fluorescence from the first focal point P1, the second focal point P2, and the region S coexists. That is, in observing a deep region of the sample X by using a two-photon excitation microscope, it is possible to generate an out-of-focus fluorescence image by simultaneously and non-simultaneously irradiating the sample X with the two laser beams L1 and L2 at mutually close positions to acquire fluorescence images for the individual cases and then calculating the difference between the images. This makes it possible to generate an in-focus fluorescence image by subtracting the out-of-focus fluorescence image generated as described above from an image in which in-focus fluorescence and out-of-focus fluorescence coexist.

An image acquisition method using the thus-configured image acquisition device 1 according to this embodiment will be described below.

Figure 3:
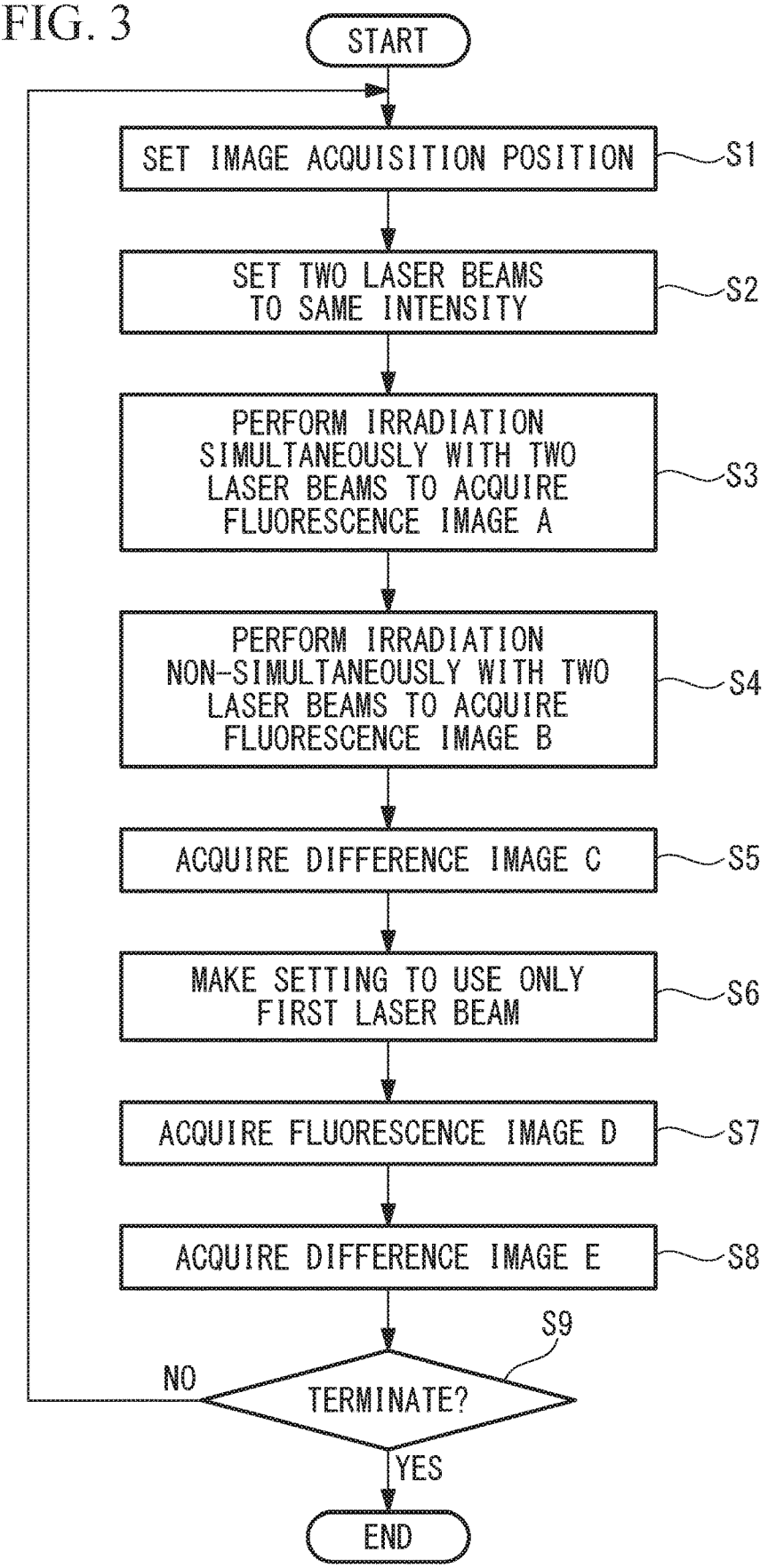
FIG. 3 is a flowchart for explaining an image acquisition method according to an embodiment of the present invention, in which the image acquisition device in FIG. 1 is used.

In the image acquisition method according to this embodiment, as shown in FIG. 3, first, an image acquisition position in the sample X is set (step S1).

In step S1, the λ/2 plate 8 may be rotated to adjust the laser-beam splitting ratio of the first polarizing beam splitter 9 so that irradiation will be performed with only the first laser beam L1 or the second laser beam L2.

Then, the λ/2 plate 8 is rotated to set the intensity ratio of the first laser beam L1 and the second laser beam L2 emitted from the objective lens 16 to 1:1 (a first step S2). At this time, in equations (1) to (6), $I_{1-F} = I_{2-F} = I_F$ and $I_{1-S} = I_{2-S} = I_S$.

In this state, the optical-path length of the second laser beam L2 is set by using the optical-path-adjustment optical system 10 so that the sample X will be irradiated simultaneously with the first laser beam L1 and the second laser beam L2, and the scanning unit 4 is driven to scan the sample X with the first laser beam L1 and the second laser beam L2, thereby acquiring a fluorescence image (first image) A (a simultaneous illumination step S3, or a second step). The signal intensity of the fluorescence image A at this time is expressed by equations (1) to (3) and (5) to (7).

$$I_A = \alpha I_F^2 + \beta I_F^2 + 4\gamma I_S^2 \quad (7)$$

Furthermore, in this state, the optical-path length of the second laser beam L2 is set by using the optical-path-adjustment optical system 10 so that the sample X will be irradiated non-simultaneously with the first laser beam L1 and the second laser beam L2, and the scanning unit 4 is driven to scan the sample X with the first laser beam L1 and the second laser beam L2, thereby acquiring a fluorescence image (second image) B (a non-simultaneous illumination step S4, or the second step). The signal intensity of the fluorescence image B at this time is expressed by equations (1), (2), (4), and (5) to (8).

Then, the processing device 6 generates a difference image C by subtracting the acquired fluorescence image B from the acquired fluorescence image A (a calculating step S5, or the second step). The signal intensity of the difference image C is expressed by equation (9).

$$I_B = \alpha I_F^2 + \beta I_F^2 + 2\gamma I_S^2 \quad (8)$$

$$I_C = 2\gamma I_S^2 \quad (9)$$

Then, the λ/2 plate 8 is rotated to adjust the laser-beam splitting ratio of the first polarizing beam splitter 9 so that the sample X will be irradiated only with the first laser beam L1 (step S6). Then, the scanning unit 4 is driven to scan the sample X with the first laser beam L1, thereby acquiring a fluorescence image D (the first step S7).

The fluorescence image D includes fluorescence signals from the first focal point P1 and the region S. Furthermore, the laser beams split into two by the first polarizing beam splitter 9 are combined to become only the first laser beam L1, the intensities of the first laser beam L1 at the first focal point P1 and the region S become $2I_F$ and $2I_S$, respectively. As a result, the signal intensity of the fluorescence image D is expressed by equation (10).

$$I_D = 4\alpha I_F^2 + 4\gamma I_S^2 \quad (10)$$

The processing device 6 multiplies the signal intensity of the fluorescence image D by ½ and subtracts the difference image C from the result to generate a difference image E (a third step S8). The signal intensity of the difference image E is expressed by equation (9) and (10) to (11). Equation (11)

includes only the term with the coefficient α, and the terms with the coefficients β and γ are removed. This indicates that a fluorescence image including only the fluorescence signal from the first focal point P1 has been generated.

$$I_E = 2\alpha I_S^2 \quad (11)$$

As described above, with the image acquisition device 1 and the image acquisition method according to this embodiment, it is possible to generate an in-focus fluorescence image including only in-focus fluorescence from a mixed image including both the in-focus fluorescence and out-of-focus fluorescence. In the case where any other position to be observed remains, the processing from step S1 is repeated.

With the image acquisition device 1 and the image acquisition method according to this embodiment, two fluorescence images A and B having mutually different intensities of out-of-focus fluorescence signals are acquired while switching the irradiation timings of the first laser beam L1 and the second laser beam L2, and the difference between the fluorescence images A and B is calculated to generate a difference image C including only out-of-focus fluorescence. Then, the difference between the difference image C and a fluorescence image D including both in-focus fluorescence and out-of-focus fluorescence is calculated to generate a difference image E including only in-focus fluorescence.

Since no operation such as modulating the focus distribution at a focal point is performed in these processing steps, loss does not occur in the in-focus fluorescence signal in calculating the difference between the fluorescence image D and the difference image C. Therefore, an advantage is afforded in that it is possible to obtain an in-focus fluorescence image without decreasing the S/N ratio.

In the image acquisition device 1 according to this embodiment, a λ/4 plate may be adopted instead of the λ/2 plate 8 disposed upstream of the first polarizing beam splitter 9. Furthermore, in the case where the sample X has no polarization dependency, the λ/4 plate 12 disposed downstream of the second polarizing beam splitter 11 may be omitted so that the first laser beam L1 and the second laser beam L2 will be linearly polarized.

Furthermore, in the flowchart in FIG. 3, the order of image acquisition is not limited, and the fluorescence image D may be acquired before acquiring the fluorescence images A and B. Furthermore, in step S2, instead of setting the intensity ratio of the first laser beam L1 and the second laser beam L2 to 1:1, the ratio may be set to some other ratio, and a multiplication coefficient with which the term with the coefficient γ can be removed may be applied before calculating the difference. Furthermore, when acquiring the fluorescence image D, instead of performing irradiation only with the first laser beam L1 as described above, irradiation may be performed only with the second laser beam L2.

Figure 4:
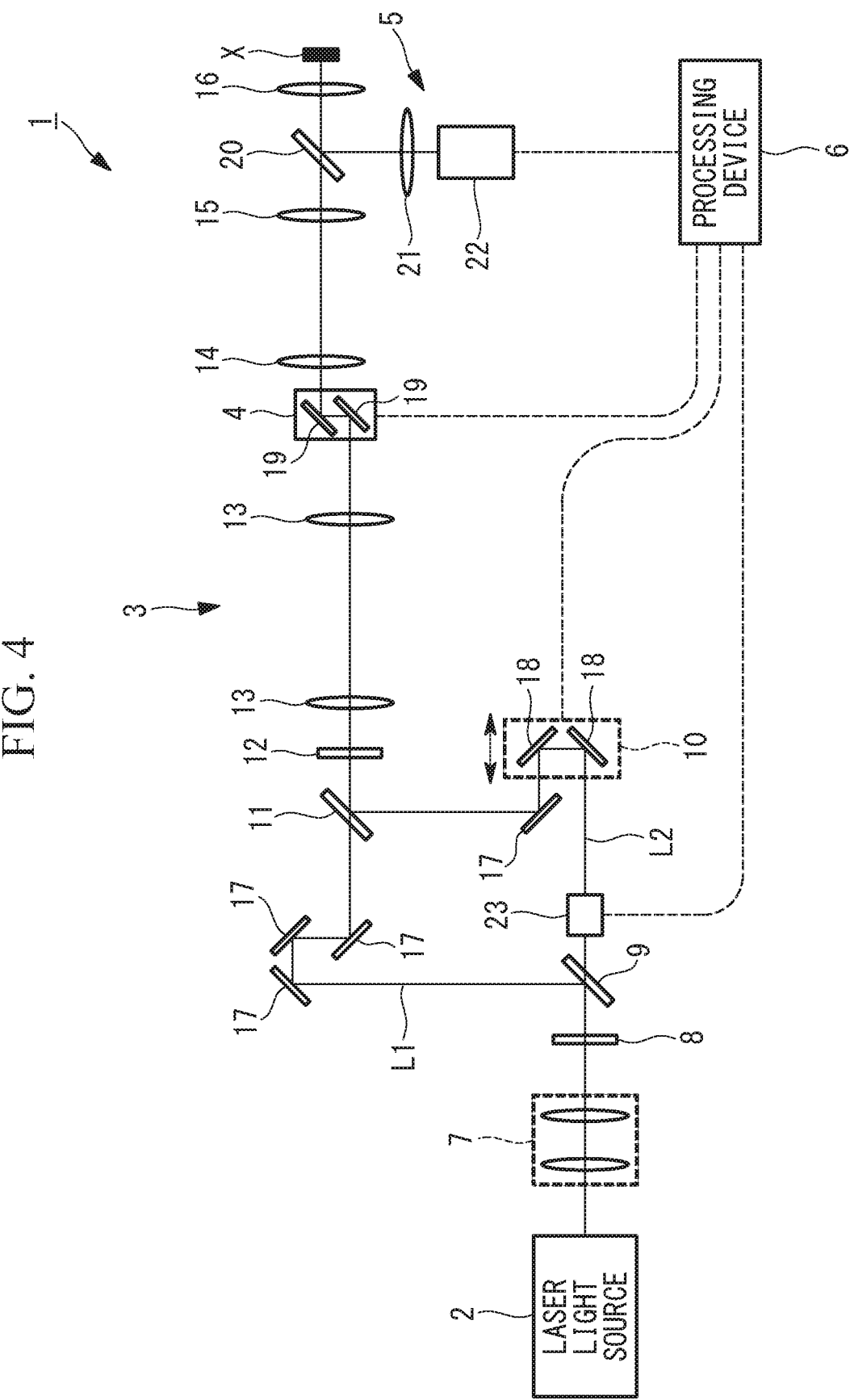
FIG. 4 is a schematic illustration showing a first modification of the image acquisition device in FIG. 1.

Furthermore, as shown in FIG. 4, a light-intensity modulating element 23 that turns the second laser beam L2 on and off by modulating the intensity thereof may be disposed on the optical path of the second laser beam L2 between the first polarizing beam splitter 9 and the second polarizing beam splitter 11. As the light-intensity modulating element 23, an acousto-optical element or an electro-optical element may be adopted.

Figure 5:
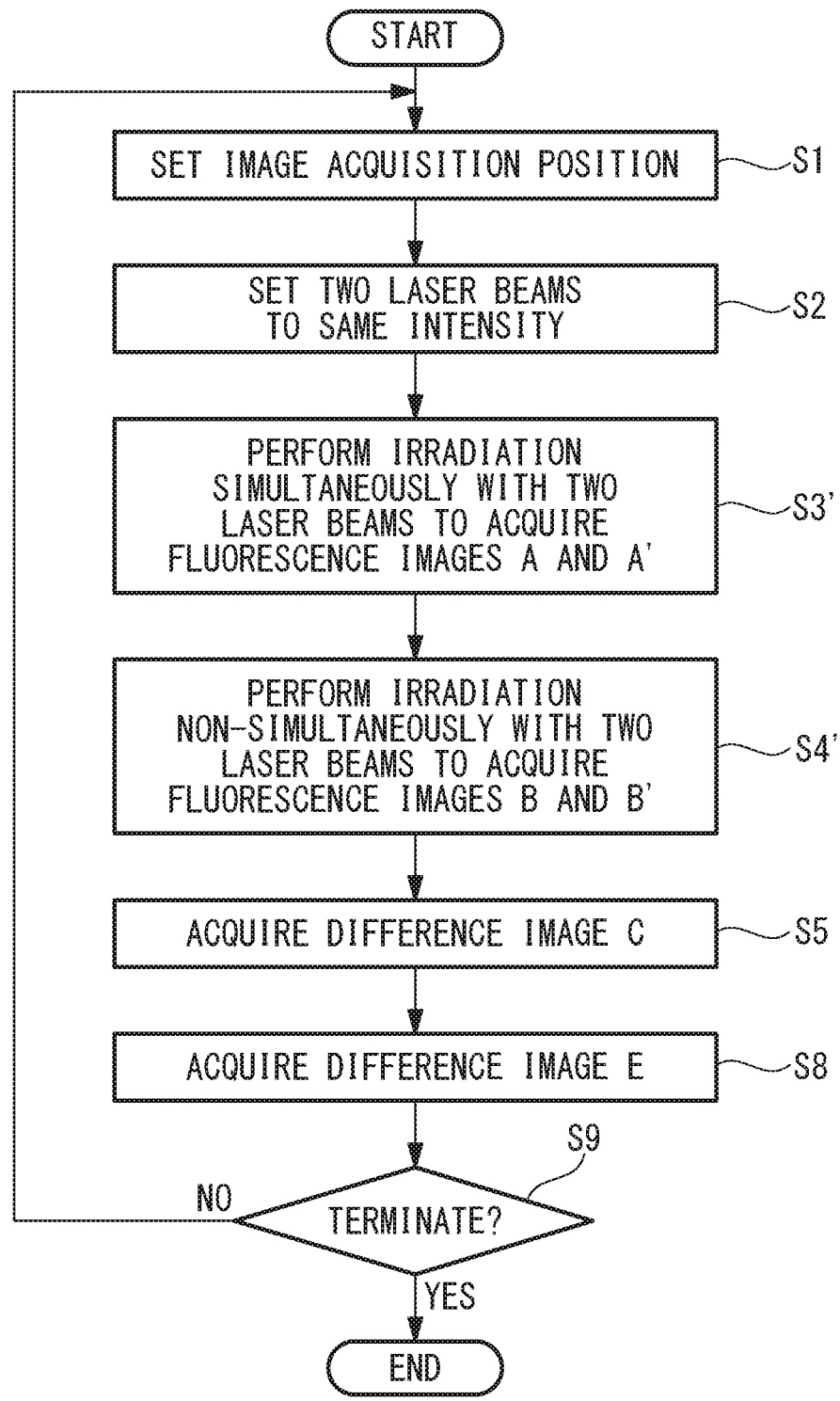
FIG. 5 is a flowchart for explaining an image acquisition method in which the image acquisition device in FIG. 4 is used.

An image acquisition method using the thus-configured image acquisition device 1 will be described with reference to a flowchart shown in FIG. 5.

The setting of an image acquisition position (step S1) and the setting of the λ/2 plate 8 to set the intensity ratio of the first laser beam L1 and the second laser beam L2 to 1:1 (the first step S2) are the same as those in the case described above. In this state, the light-intensity modulating element 23 is activated to turn the second laser beam L2 on and off.

Then, fluorescence images are acquired at an irradiation timing at which the sample X is irradiated simultaneously with the first laser beam L1 and the second laser beam L2. At this time, the intensity of the second laser beam L2 is modulated time-periodically such that the second laser beam L2 is turned on and off in a rectangular wave shape having a duty ratio of 1:1, and the image acquisition speed and the intensity modulation frequency are adjusted so that at least one period of intensity modulation will be included in one pixel of image acquisition.

Then, fluorescence is detected individually at irradiation timings when the second laser beam L2 is on and off, and a fluorescence image A at the on irradiation timing and a fluorescence image A' at the off irradiation timing are individually acquired (a simultaneous illumination step S3', or a second step).

Then, at an irradiation timing when the sample X is irradiated non-simultaneously with the first laser beam L1 and the second laser beam L2, similarly, a fluorescence image B at an irradiation timing when the second laser beam L2 is on and a fluorescence image B' at an irradiation timing when the second laser beam L2 is off are individually acquired (a non-simultaneous illumination step S4', or the second step). The fluorescence intensities of the fluorescence images A and B are expressed by equations (7) and (8), respectively. Meanwhile, at the time of acquisition of the fluorescence images A' and B', since the first laser beam L1 and the second laser beam L2 remain split, the excitation intensities are $I_F$ and $I_S$, and the value of the fluorescence intensity is obtained by multiplying equation (10) by ¼.

Compared with the case of equation (10), since the excitation intensity becomes ½ as small, the fluorescence frequency becomes ¼ as small, which is the square of ½.

Then, similarly to the case described above, the fluorescence image B is subtracted from the fluorescence image A to generate an out-of-focus fluorescence image C having the fluorescence intensity expressed by equation (9) (a calculating step S5, or the second step). Then, the fluorescence images A' and B' are added together, and the out-of-focus fluorescence image C is subtracted from the result, thereby acquiring an in-focus fluorescence image E having the fluorescence intensity expressed by equation (11) (a third step S8).

That is, with this operation, when acquiring images while switching the irradiation timings of the first laser beam L1 and the second laser beam L2 between simultaneous and non-simultaneous timings, it is possible to also acquire an image only with the first laser beam L1 through intensity modulation. In the case where an electro-optical element is used as the light-intensity modulating element 23, since the speed of intensity modulation is incomparably faster than the scanning speed of the biaxial galvanometer mirror 19, an advantage is afforded in that it is possible to acquire an in-focus fluorescence image substantially in the time needed for acquiring two images.

Figure 6:
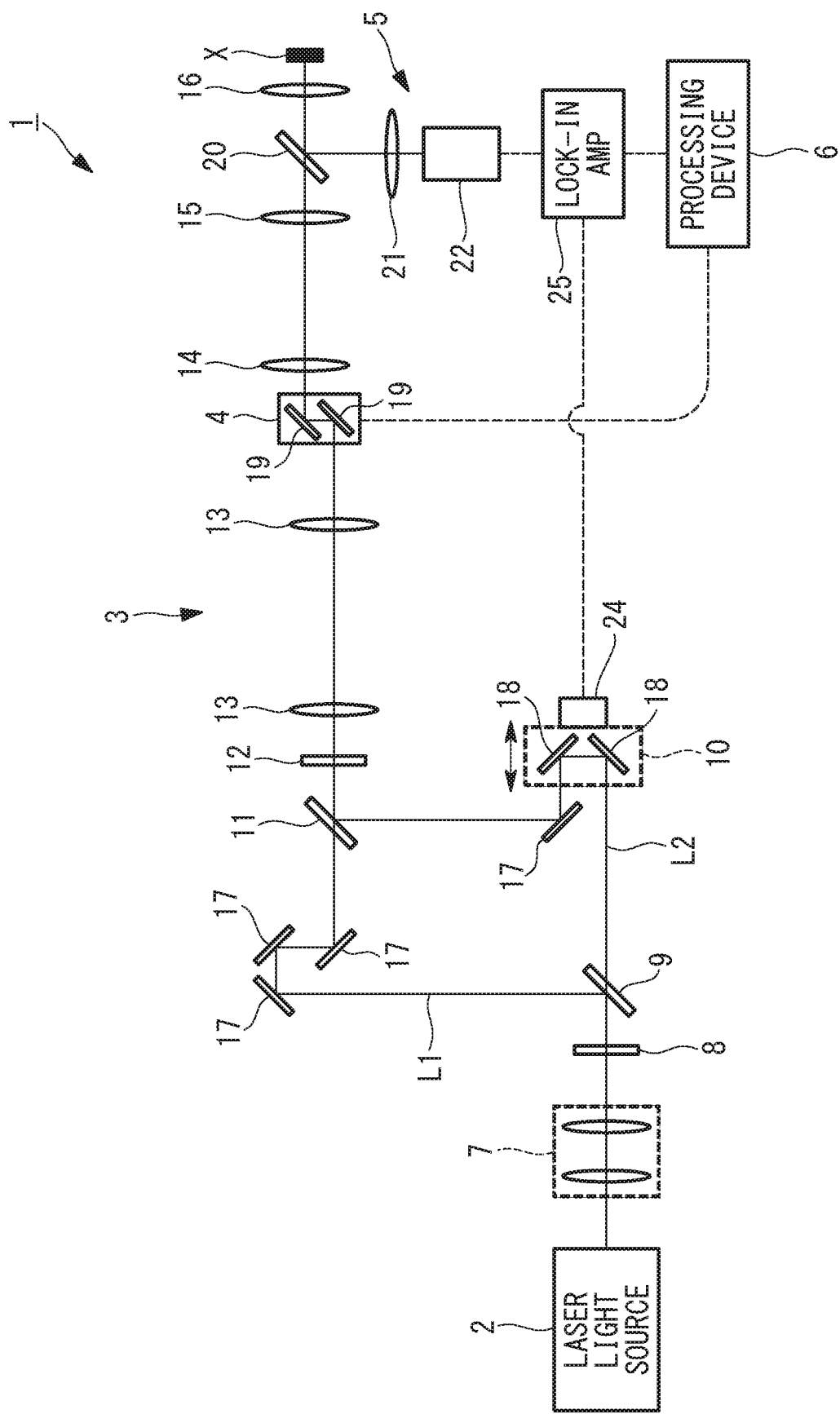
FIG. 6 is a schematic illustration showing a second modification of the image acquisition device in FIG. 1.

Alternatively, in the image acquisition device 1 according to this embodiment, as shown in FIG. 6, an optical-path-length modulating element 24 may be provided in the optical-path-adjustment optical system 10, and a signal from the light detector 22 may be processed through a lock-in amp (demodulation unit) 25. For example, a piezoelectric vibrator may be adopted as the optical-path-length modulating element 24. The optical-path-length modulating element 24 is configured to move the optical-path-adjustment optical system 10 so as to time-periodically change the optical-path length of the second laser beam L2. This makes it possible to acquire an in-focus fluorescence image from only two acquired images by utilizing modulation and demodulation technologies.

Figure 7:
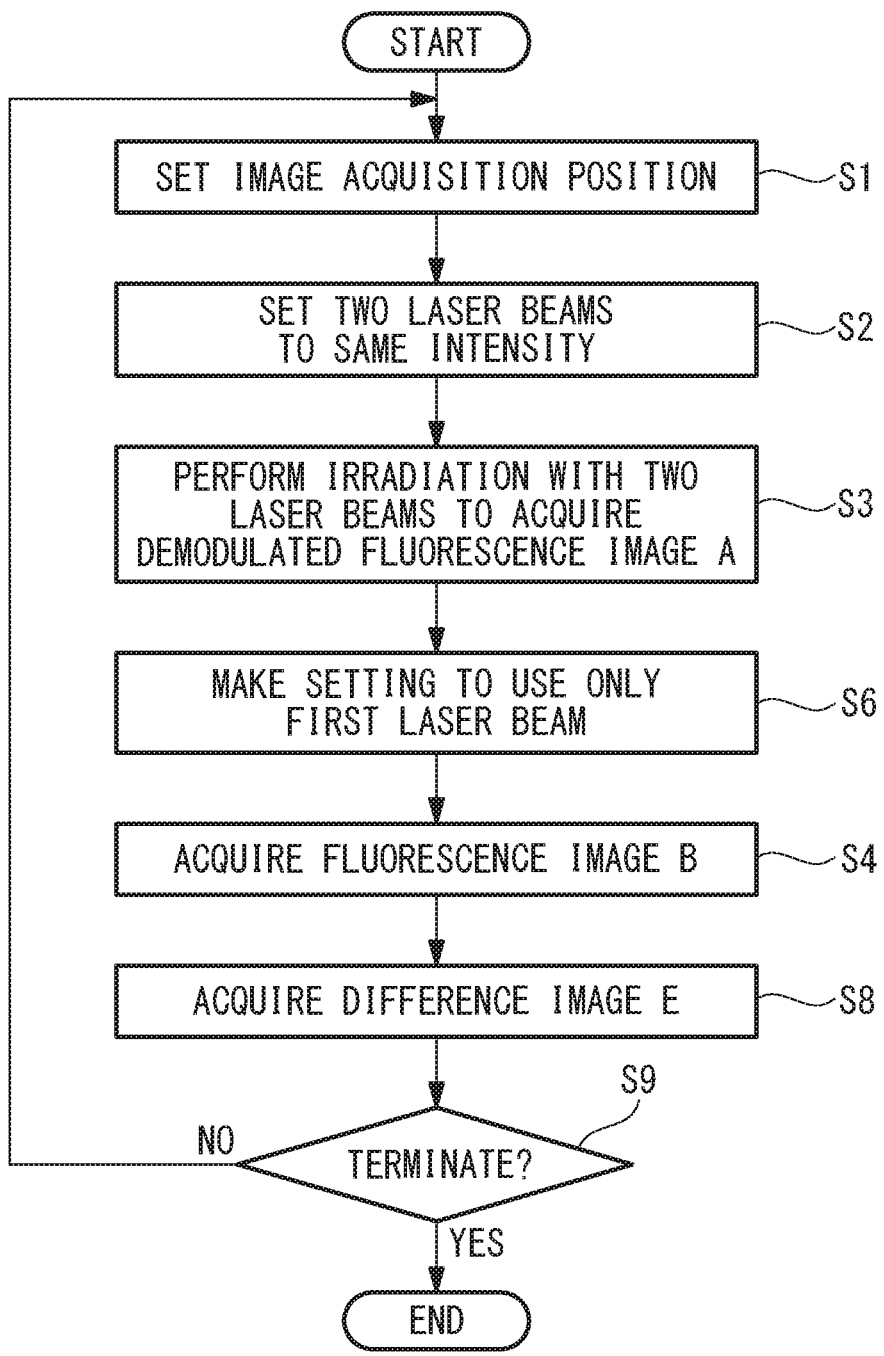
FIG. 7 is a flowchart for explaining an image acquisition method in which the image acquisition device in FIG. 6 is used.

That is, as shown in a flowchart in FIG. 7, the optical-path length of the second laser beam L2 is time-periodically modulated by the operation of the optical-path-length modulating element 24, and a fluorescence image A is generated on the basis of a demodulated signal output from the lock-in amp 25. The lock-in amp 25 is driven by using a synchronization signal from the optical-path-length modulating element 24 as a reference signal and demodulates a signal in synchronization with the modulation frequency of the optical-path-length modulating element 24.

The demodulation signal output from the lock-in amp 25 is equal to the amount of signal change due to a change in the pulse timing of the second laser beam L2, which is nothing but the difference between equations (7) and (8). Thus, the acquired fluorescence image A is an out-of-focus fluorescence image expressed by equation (9).

Then, the λ/2 plate 8 is adjusted to irradiate the sample X only with the first laser beam L1, and a fluorescence image B is generated by using a signal detected by the light detector 22 without having to perform demodulation by the lock-in amp 25. The fluorescence intensity of the fluorescence image B is equal to equation (10). By multiplying the fluorescence image B by ½ and subtracting the fluorescence image A from the result, it is possible to generate the difference image C in equation (11), i.e., an in-focus fluorescence image.

In this manner, when generating an out-of-focus fluorescence image, it is possible to directly acquire an out-of-focus fluorescence image by modulating the optical-path length with the optical-path-length modulating element 24 and demodulating a signal with the lock-in amp 25. This results in an advantage that it suffices to acquire two images, which serves to reduce the time needed for the acquisition of an in-focus fluorescence image.

Figure 8:
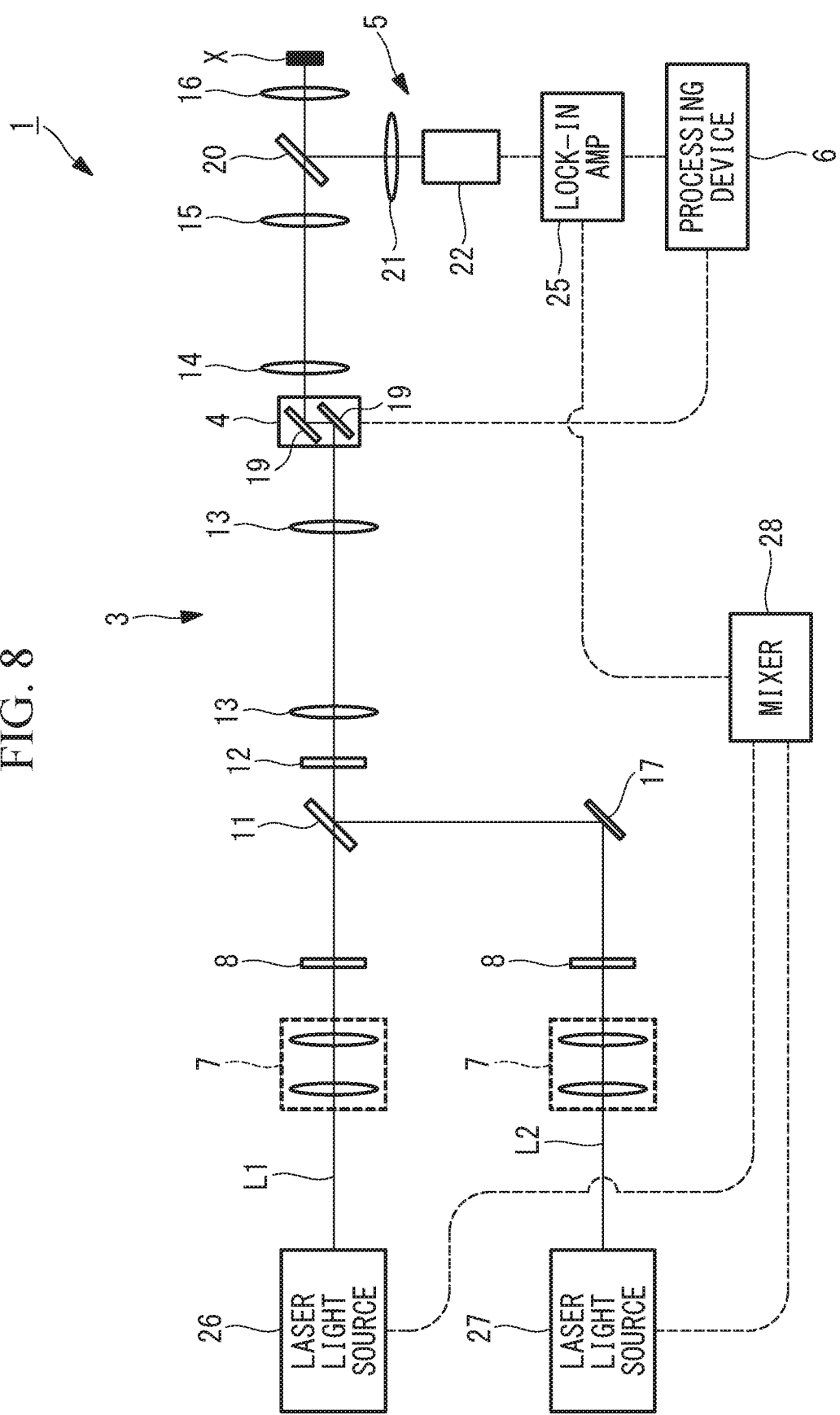
FIG. 8 is a schematic illustration showing a third modification of the image acquisition device in FIG. 1.

Furthermore, although switching between simultaneous illumination and non-simultaneous illumination is performed by switching the optical-path length of the second laser beam L2 in the embodiments described above, alternatively, as shown in FIG. 8, the repetition frequencies of a first laser beam L1 and a second laser beam L2 respectively emitted from separate laser light sources 26 and 27 may be slightly varied from each other. In this case, synchronization signals of the individual laser light sources 26 and 27 are input to a mixer 28, and a synchronization signal having a frequency representing the difference between the repetition frequencies of the synchronization signals is output to the lock-in amp 25 and is used as a reference signal.

Since the repetition frequencies of the first laser beam L1 and the second laser beam L2 slightly vary from each other, the irradiation timings thereof periodically deviate from each other, whereby simultaneous irradiation and non-simultaneous illumination are repeated at a period corresponding to the difference between the repetition frequencies. That is, it is possible to attain an effect similar to that in the case where the optical-path length of the second laser beam L2 is modulated by the piezoelectric vibrator 24. Thus, also with the image acquisition device 1 in FIG. 8, it is possible to acquire an in-focus fluorescence image from only two acquired images. Note that the wavelengths of the first laser beam L1 and the second laser beam L2 may vary from each other as long as it is possible to generate fluorescence through a non-linear optical process.

Although some embodiments of the present invention have been described above, the present invention is not limited to these embodiments.

For example, although the biaxial galvanometer mirror 19 is used for the scanning unit 4 as an example, a method in which images are acquired by way of stage scanning may be adopted.

Furthermore, although a two-photon excitation microscope has been described in the above embodiments, the present invention is also applicable to other types of scanning microscope utilizing a non-linear optical process, such as an SHG microscope.

As a result, the above-described embodiment leads to the following aspects.

An aspect of the present invention is directed to an image acquisition method in which a pulsed illumination beam emitted from a light source is scanned while being focused at a sample, signal light generated as a result of a non-linear optical process at each scanning position is detected, and an image of the sample is generated on a basis of the detected signal light, the image acquisition method including: acquiring a mixed image, which includes both in-focus signal light generated at a focal position of the illumination beam in the sample and out-of-focus signal light generated at a position other than the focal position in the sample; acquiring an image of the out-of-focus signal light on a basis of a plurality of mixed images having mutually different intensities of the out-of-focus signal light; and acquiring an image of the in-focus signal light by subtracting the image of the out-of-focus signal light acquired, from the mixed image acquired.

According to this aspect, a pulsed illumination beam emitted from the light source is scanned while being focused at a sample. Then, at each scanning position, as a result of a non-linear optical process, in-focus signal light is generated at a focal position of the illumination beam, and out-of-focus signal light is generated at a position other than the focal position. By the acquiring of the mixed image, a mixed image, which includes both the in-focus signal light and the out-of-focus signal light, is acquired.

Meanwhile, by the acquiring of the image of the out-of-focus signal light, a plurality of mixed images having mutually different intensities of the out-of-focus signal light are acquired, and an image of the out-of-focus signal light is acquired on the basis of the plurality of acquired mixed images.

Then, by the acquiring of the image of the in-focus signal light, an image of the in-focus signal light is acquired by subtracting the image of the out-of-focus signal light from the mixed image.

In this case, according to this aspect, it is possible to generate an image of out-of-focus signal light without having to modulate the signal intensity at a focal position. Thus, a loss does not occur in the signal from the focal position when subtracting the image of the out-of-focus signal light from a mixed image. As a result, it is possible to acquire a clear signal-light image by excluding the out-of-focus signal light without decreasing the S/N ratio.

In the above aspect, the acquiring of the image of the out-of-focus signal light may include generating a first image of the sample by simultaneously focusing two pulsed illumination beams at different positions in the sample; generating a second image of the sample by non-simultaneously focusing the two pulsed illumination beams at different positions in the sample; and acquiring an image of the out-of-focus signal light on a basis of the first image generated and the second image generated.

Accordingly, the first image, generated by simultaneously focusing the two pulsed illumination beams at different positions in the sample, includes high-intensity out-of-focus signal light, and the second image, generated by non-simultaneously focusing the two pulsed illumination beams at different positions in the sample, includes out-of-focus signal light having a lower intensity compared with the first image. This makes it possible to readily acquire an image of the out-of-focus signal light from the first image and the second image acquired while varying the method of irradiating the sample with the two pulsed illumination beams.

Furthermore, in the above aspect, the acquiring of the image of the out-of-focus signal light subtracts the second image generated from the first image generated.

This makes it possible to readily acquire an image of the out-of-focus signal light just by subtracting the second image from the first image.

Furthermore, in the above aspect, the acquiring of the mixed image generates the mixed image on a basis of the signal light detected with either one of the illumination beams blocked.

This makes it possible to readily perform switching between the acquiring of the mixed image and the acquiring of the image of the out-of-focus signal light by turning the illumination beam on one of the optical paths on and off.

In the above aspect, the generating of the first image of the sample and the generating of the second image of the sample are performed while performing switching time-periodically between states in which the optical-path lengths of the two illumination beams are mutually equal and are mutually different.

This makes it possible to readily perform switching time-periodically between the generating of the first image of the sample executed while equalizing the optical-path lengths of the two illumination beams and the generating of the second image of the sample executed while varying the optical-path lengths of the two illumination beams.

Furthermore, in the above aspect, illumination beams having mutually different repetition frequencies may be adopted as the two illumination beams.

This makes it possible, when the sample is irradiated with the two illumination beams having mutually different repetition frequencies, to automatically perform switching time-periodically between the generating of the first image of the sample, in which irradiation is performed simultaneously with the two illumination beams, and the generating of the second image of the sample, in which irradiation is performed separately.

Furthermore, in the above aspect, the acquiring of the image of the out-of-focus signal light generates the image of the out-of-focus signal light on a basis of a demodulated signal obtained by time-periodically demodulating the detected signal light.

This makes it possible to individually extract, by performing time-periodical demodulation, signal light acquired by the generating of the first image of the sample and the generating of the second image of the sample while time-periodically performing switching therebetween, thereby readily generating an image of the out-of-focus signal light.

Furthermore, in the above aspect, the non-linear optical process may include a multiphoton absorption process, the illumination beam may include an ultra-short-pulse laser beam, and the signal light may include fluorescence.

This makes it possible to acquire a fluorescence image having a high S/N ratio by applying the above aspect to a multiphoton microscope.

Another aspect of the present invention is directed to an image acquisition device including: a scanner that is configured to scan a pulsed illumination beam emitted from a light source; an illumination optical system that is configured to irradiate a sample with the illumination beam scanned by the scanner; a detection optical system that is configured to detect signal light generated as a result of a non-linear optical process at a position where the sample is irradiated with the illumination beam by the illumination optical system; and an image generator that is configured to generate a signal-light image on a basis of the signal light detected by the detection optical system, wherein the image generator is configured to generate an out-of-focus signal-light image from a plurality of images having mutually different intensities of out-of-focus signal light generated at a position other than a focal point of the illumination beam in the sample, and is configured to generate an in-focus signal-light image by subtracting the out-of-focus signal-light image from a mixed image including both in-focus signal light and the out-of-focus signal light generated at a focal position of the illumination beam in the sample.

According to this aspect, when an illumination beam emitted from the light source is scanned by the scanner and the sample is irradiated therewith by the illumination optical system, signal light is generated as a result of a non-linear optical process at each scanning position of the illumination beam, and the signal light is detected by the detection optical system. The detected signal light includes in-focus signal light generated at a focal position of the illumination beam and out-of-focus signal light generated at a position other than the focal position. The image generator is configured to generate an out-of-focus signal-light image from a plurality of images having mutually different intensities of the out-of-focus signal light, and is configured to generate an in-focus signal-light image by subtracting the out-of-focus signal-light image from a mixed image including both the in-focus signal light and the out-of-focus signal light.

That is, according to this aspect, it is possible to generate an image of out-of-focus signal light without having to modulate the signal intensity at a focal position. Thus, a loss does not occur in the signal from the focal position when subtracting the image of the out-of-focus signal light from a mixed image. As a result, it is possible to acquire a clear signal-light image by excluding the out-of-focus signal light without decreasing the S/N ratio.

In the above aspect, the image generating unit may be configured to generate a first image of the sample by simultaneously focusing two pulsed illumination beams at different positions in the sample, may be configured to generate a second image of the sample by non-simultaneously focusing the two pulsed illumination beams at different positions in the sample, and may be configured to acquire the out-of-focus signal-light image on a basis of the first image and the second image.

Furthermore, in the above aspect, the image generator may be configured to acquire the out-of-focus signal-light image by subtracting the second image from the first image.

Furthermore, in the above aspect, the image acquisition device may further include a light-intensity modulating element that is disposed on one of the optical paths of the two illumination beams and that is configured to modulate the intensity of the illumination beam passing along the one optical path, and the image generator may be configured to generate the out-of-focus signal-light image on a basis of the signal light detected when the intensity of the illumination beam passing along the one optical path is set to be equal to the intensity of the illumination beam passing along the other optical path by the light-intensity modulating element, and may be configured to generate the mixed image on a basis of the signal light detected when the illumination beam passing along the one optical path is blocked by the light-intensity modulating element.

Accordingly, the intensity of the illumination beam passing along the one optical path is modulated by the light-intensity modulating element, an out-of-focus signal-light image is generated on the basis of the signal light detected when the intensity of the illumination beam passing along the one optical path is set to be equal to the intensity of the illumination beam passing along the other optical path, and a mixed image is generated on the basis of the signal light detected when the illumination beam passing along the one optical path is blocked by the light-intensity modulating element.

Furthermore, in the above aspect, the image acquisition device may further include an optical-path-length modulating element that is disposed on one of the optical paths of the two illumination beams and that is time-periodically configured to modulate the optical-path length of the illumination beam passing along the one optical path, and the image generator may be configured to generate the first image on a basis of the signal light detected when the optical-path lengths of the two illumination beams are equalized by the optical-path-length modulating element, and may be configured to generate the second image on a basis of the signal light detected when the optical-path lengths of the two illumination beams are mutually varied.

Accordingly, a first image is generated on the basis of the signal light detected when the optical-path lengths of the two illumination beams are equalized by the optical-path-length modulating element, and a second image is generated on the basis of the signal light detected when the optical-path lengths of the two illumination beams are mutually varied by the optical-path-length modulating element.

Furthermore, in the above aspect, the image generator may be configured to irradiate the sample with two pulsed illumination beams having mutually different repetition frequencies to time-periodically perform switching between a state where the two illumination beams are simultaneously focused at the sample and a state where the two illumination beams are non-simultaneously focused at the sample.

Furthermore, in the above aspect, the image acquisition device may further include a demodulator that is time-periodically configured to demodulate the detected signal light, and the image generator may be configured to generate the out-of-focus signal-light image by using a demodulated signal obtained as a result of demodulation by the demodulator.

This makes it possible to individually extract, by performing time-periodical demodulation by using the demodulator, signal light acquired by the generating of the first image of the sample and the generating of the second image of the sample while time-periodically performing switching therebetween, thereby readily generating an image of the out-of-focus signal light.

Furthermore, in the above aspect, the non-linear optical process may include a multiphoton absorption process, the illumination beam may include an ultra-short-pulse laser beam, and the signal light may include fluorescence.

According to the present invention, an advantage is afforded in that it is possible to acquire a clear signal-light image by excluding out-of-focus signal light without decreasing the S/N ratio.

REFERENCE SIGNS LIST

1 Image acquisition device
2, 26, 27 Light source (laser light source)
3 Illumination optical system
4 Scanning unit
5 Detection optical system
6 Processing device (image generating unit)
23 Light-intensity modulating element
24 Optical-path-length modulating element
25 Lock-in amp (demodulation unit)
S2, S7 First step
S3, S3', S4, S4', S5 Second step
S8 Third step
S3, S3' Simultaneous illumination step
S4, S4' Non-simultaneous illumination step
S5 Calculating step
A Fluorescence image (first image)
B Fluorescence image (second step)
L1, L2 Laser beam (illumination beam)
X Sample

The invention claimed is:

1. An image acquisition method in which a pulsed illumination beam emitted from a light source is scanned while being focused at a sample, signal light generated as a result of a non-linear optical process at each scanning position is detected, and a first signal image of the sample is generated on a basis of the detected signal light, the image acquisition method comprising:
acquiring a plurality of mixed images, each of the plurality of mixed images including both in-focus signal light generated at a focal position of the pulsed illumination beam in the sample and out-of-focus signal light generated at a position other than the focal position in the sample;
acquiring a noise image of the out-of-focus signal light on a basis of the plurality of mixed images having mutually different intensities of the out-of-focus signal light; and
acquiring a second signal image of the in-focus signal light by subtracting the noise image of the out-of-focus signal light acquired, from at least one of the plurality of mixed images acquired,
wherein the acquiring of the noise image of the out-of-focus signal light comprises:
generating a first image of the sample by simultaneously focusing two pulsed illumination beams at different positions in the sample;
generating a second image of the sample by non-simultaneously focusing the two pulsed illumination beams at different positions in the sample; and
acquiring the noise image of the out-of-focus signal light on a basis of the first image generated and the second image generated,
wherein the generating of the first image of the sample and the generating of the second image of the sample are performed while performing switching time-periodically between states in which the optical-path lengths of the two pulsed illumination beams are mutually equal and are mutually different, and
wherein the acquiring of the noise image of the out-of-focus signal light comprises generating the noise image of the out-of-focus signal light on a basis of a demodulated signal obtained by time-periodically demodulating the detected signal light.

2. The image acquisition method according to claim 1, wherein the acquiring of the noise image of the out-of-focus signal light comprises subtracting the second image generated from the first image generated.

3. The image acquisition method according to claim 1, wherein the acquiring of the plurality of mixed image generates the plurality of mixed images on a basis of the signal light detected with either one of the two pulsed illumination beams blocked.

4. The image acquisition method according to claim 1, wherein illumination beams having mutually different repetition frequencies are adopted as the two pulsed illumination beams.

5. The image acquisition method according to claim 1, wherein the non-linear optical process comprises a multiphoton absorption process,
wherein the pulsed illumination beam comprises an ultrashort-pulse laser beam, and
wherein the signal light comprises fluorescence.

6. An image acquisition device comprising:
a scanner configured to scan a pulsed illumination beam emitted from a light source;
an illumination optical system configured to irradiate a sample with the pulsed illumination beam scanned by the scanner;
a detection optical system configured to detect signal light generated as a result of a non-linear optical process at a position where the sample is irradiated with the pulsed illumination beam by the illumination optical system; and
a processor configured to generate a signal-light image on a basis of the signal light detected by the detection optical system,
wherein the processor is configured to:
generate an out-of-focus signal-light image from a plurality of mixed images having mutually different intensities of out-of-focus signal light generated at a position other than a focal point of the pulsed illumination beam in the sample; and
generate an in-focus signal-light image by subtracting the out-of-focus signal-light image from the plurality of mixed images, each including both in-focus signal light and the out-of-focus signal light generated at a focal position of the pulsed illumination beam in the sample,
wherein the processor is configured to:
generate a first image of the sample by simultaneously focusing two pulsed illumination beams at different positions in the sample;
generate a second image of the sample by non-simultaneously focusing the two pulsed illumination beams at different positions in the sample; and
acquire the out-of-focus signal-light image on a basis of the first image and the second image,
wherein the image acquisition device further comprises an optical-path-length modulating element that is disposed on one of the optical paths of the two pulsed illumination beams and that is time-periodically configured to modulate the optical-path length of the pulsed illumination beam passing along the one optical path,
wherein the processor is configured to:
generate the first image on a basis of the signal light detected when the optical-path lengths of the two pulsed illumination beams are equalized by the optical-path-length modulating element; and
generate the second image on a basis of the signal light detected when the optical-path lengths of the two pulsed illumination beams are mutually varied,
wherein the image acquisition device further comprises a demodulator that is time-periodically configured to demodulate the detected signal light, and
wherein the processor is configured to generate the out-of-focus signal-light image by using a demodulated signal obtained as a result of demodulation by the demodulator.

7. The image acquisition device according to claim 6, wherein the processor is configured to acquire the out-of-focus signal-light image by subtracting the second image from the first image.

8. The image acquisition device according to claim 6, further comprising:
a light-intensity modulating element that is disposed on one of the optical paths of the two illumination beams and that is configured to modulate the intensity of the illumination beam passing along the one optical path,
wherein the processor is configured to:
generate the out-of-focus signal-light image on a basis of the signal light detected when the intensity of the pulsed illumination beam passing along the one optical path is set to be equal to the intensity of the pulsed illumination beam passing along the other optical path by the light-intensity modulating element; and
generate the plurality of mixed images on a basis of the signal light detected when the pulsed illumination beam passing along the one optical path is blocked by the light-intensity modulating element.

9. The image acquisition device according to claim 6, wherein the processor is configured to irradiate the sample with two pulsed illumination beams having mutually different repetition frequencies to time-periodically perform switching between a state where the two pulsed illumination beams are simultaneously focused at the sample and a state where the two pulsed illumination beams are non-simultaneously focused at the sample.

10. The image acquisition device according to claim 6, wherein the non-linear optical process comprises a multiphoton absorption process,
wherein the pulsed illumination beam comprises an ultrashort-pulse laser beam, and
wherein the signal light comprises fluorescence.

* * * * *